United States Patent
Kassam et al.

(10) Patent No.: US 9,497,418 B2
(45) Date of Patent: Nov. 15, 2016

(54) INTERACTIVE DATA WIDGETS FOR VIDEO

(75) Inventors: Shafiq Kassam, Lewisville, TX (US);
Prabhakar Mani, Lewisville, TX (US);
Raul Aldrey, Dallas, TX (US);
Maitreyi Krishnaswamy, New York, NY (US); Anil Guntupalli, Wayland, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 2510 days.

(21) Appl. No.: 11/600,353

(22) Filed: Nov. 16, 2006

(65) Prior Publication Data

US 2008/0120664 A1 May 22, 2008

(51) Int. Cl.
| | | |
|---|---|---|
| *G06F 3/00* | (2006.01) | |
| *G06F 13/00* | (2006.01) | |
| *H04N 5/445* | (2011.01) | |
| *H04N 7/173* | (2011.01) | |
| *H04N 21/45* | (2011.01) | |
| *H04N 21/4722* | (2011.01) | |
| *H04N 21/475* | (2011.01) | |
| *H04N 21/488* | (2011.01) | |
| *H04N 21/81* | (2011.01) | |

(52) U.S. Cl.
CPC ...... *H04N 7/17318* (2013.01); *H04N 21/4532* (2013.01); *H04N 21/4722* (2013.01); *H04N 21/4755* (2013.01); *H04N 21/488* (2013.01); *H04N 21/4886* (2013.01); *H04N 21/8126* (2013.01)

(58) Field of Classification Search
CPC .................................................. H04N 21/4886
USPC ....... 725/135, 110, 105, 131, 100, 138, 139, 725/151, 147, 144, 114; 398/49, 73, 60; 713/153
See application file for complete search history.

(56) References Cited

U.S. PATENT DOCUMENTS

| | | | | |
|---|---|---|---|---|
| 5,619,250 | A * | 4/1997 | McClellan et al. | 725/132 |
| 6,160,570 | A * | 12/2000 | Sitnik | 725/9 |
| 6,177,931 | B1 * | 1/2001 | Alexander et al. | 725/52 |
| 6,240,555 | B1 * | 5/2001 | Shoff et al. | 725/110 |
| 6,536,041 | B1 * | 3/2003 | Knudson | H04N 21/235 375/E7.024 |
| 6,931,018 | B1 * | 8/2005 | Fisher | 370/401 |
| 6,986,154 | B1 * | 1/2006 | Price et al. | 725/46 |
| 7,441,203 | B2 * | 10/2008 | Othmer et al. | 715/774 |
| 2002/0010932 | A1 * | 1/2002 | Nguyen et al. | 725/51 |
| 2002/0059594 | A1 * | 5/2002 | Rasmussen et al. | 725/37 |
| 2002/0078453 | A1 * | 6/2002 | Kuo | 725/46 |
| 2002/0188953 | A1 * | 12/2002 | Kenworthy | 725/105 |
| 2003/0167467 | A1 * | 9/2003 | Allen | H04N 7/163 725/47 |
| 2003/0204854 | A1 * | 10/2003 | Blackketter et al. | 725/113 |
| 2004/0133689 | A1 * | 7/2004 | Vasisht | 709/228 |
| 2005/0028206 | A1 * | 2/2005 | Cameron et al. | 725/46 |
| 2006/0179306 | A1 * | 8/2006 | Kikkoji et al. | 713/168 |
| 2007/0061724 | A1 * | 3/2007 | Slothouber et al. | 715/716 |
| 2007/0283384 | A1 * | 12/2007 | Haeuser et al. | 725/34 |
| 2008/0034392 | A1 * | 2/2008 | McCarthy et al. | 725/61 |

FOREIGN PATENT DOCUMENTS

| | | | | |
|---|---|---|---|---|
| WO | WO 99/09744 | * | 2/1999 | H04N 7/173 |
| WO | WO 99-09744 | * | 2/1999 | H04N 7/173 |

* cited by examiner

*Primary Examiner* — Jason Salce (57) ABSTRACT

A content processing device is configured to store a parameter indicative of a content preference of a system user, to request and receive data relating to the stored parameter, to receive an incoming video signal, and to provide to a video display at least a portion of the video signal and a data interface including at least a subset of the data.

19 Claims, 5 Drawing Sheets

INTERACTIVE DATA WIDGETS FOR VIDEO

BACKGROUND INFORMATION

Current video programming sometimes provides a "crawl" across the bottom of a video screen. A crawl may provide information in textual format such as news, weather, traffic information, sports scores, etc. The information thus displayed is chosen by a video programmer, and cannot be controlled by a user or viewer of video. In fact, video users generally have no way to prevent a crawl from being displayed, or of selecting times when a crawl will be displayed, despite the fact that a crawl may obscure or distract from video content that the viewer wishes to see. Further, even if the viewer does wish to see information unrelated to video programming displayed in a portion of a video screen, present systems and methods do not provide viewers with any way of selecting or customizing the information to be displayed. Thus, viewers presently are forced to view information in which they may have no interest, such as sports scores, weather, traffic, or news related to another city or geographic area.

DETAILED DESCRIPTION OF PREFERRED EMBODIMENTS

Figure 1A:
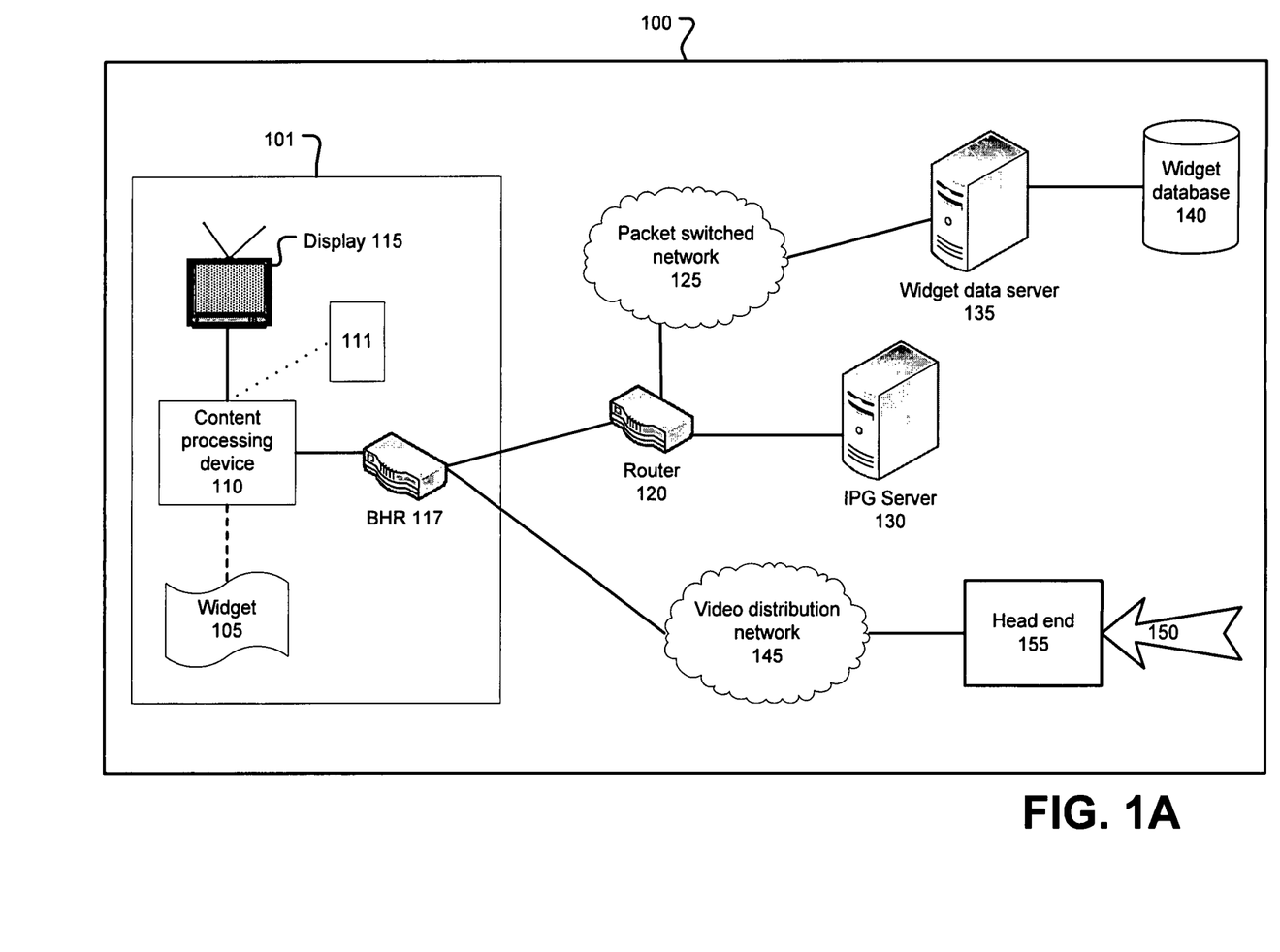
FIG. 1A illustrates an exemplary system for delivering video and for providing data using widgets.

FIG. 1A illustrates an exemplary system 100 for delivering a video signal 150 and for displaying information according to instructions included in a widget 105.

As illustrated in FIG. 1A, a customer premise 101 includes a content processing device 110, which may be controlled by a user through a control 111, to view video on a video display 115. Content processing device 110 may be a set top box (STB) or similar device known for receiving a video signal from a network and for providing video programming to video display 115.

Widget 105 includes computer-executable instructions that are generally stored in a memory of content processing device 110, and that may be executed by a processor included within content processing device 110. Instructions in widget 105 may include instructions for retrieving data from data server 135, sometimes according to input provided by a user through control 111.

Control 111 is generally a remote control that selectively communicates with content processing device 110 through known wireless communications, such as infrared (IR) communications. Control 111 generally includes numeric keys for selecting channels of video programming, as well as other keys for making selections and request according to menus provided on video display 115, in addition to arrow keys and the like for changing channels, changing volume, etc. Video display 115 may be a television receiver such as is known, including a conventional television or a high definition television (HDTV).

Content processing device 110 selectively communicates, via a broadband home router (BHR) 117, with a gateway router 120 to send information to, and receive information from, a packet switched network 125. An interactive program guide (IPG) server 130 also selectively communicates with router 120, sometimes via network 125, although this is not the case for the exemplary system illustrated in FIG. 1A.

A widget data server 135 is also in selective communication with content processing device 110, generally via network 125. A widget database 140 may be included within widget data server 135, or may be part of a separate computing system. In any event, widget data server 135 is generally configured to selectively retrieve information from widget data base 140 in response to requests for data to be included in the display of a widget 105 in display 115.

A video distribution network 145 is a network for providing a video signal 150 such as is known. For example, network 145 may include hardware and software for providing video signal 150 via coaxial cable and/or fiber optic cable. As is known, video signal 150 is generally provided to a video distribution network 145 from a head end 155.

Packet switched network 125 is generally an internet protocol (IP) network. As such, network 125 uses known protocols for transporting data, such as user datagram protocol (UDP), transport control protocol (TCP), hypertext transfer protocol (HTTP), etc. Further, network 125 may include a variety of networks such as a wide area network (WAN), e.g., the Internet, a local area network (LAN), etc. As is known, packet switched network 125, may be used to transport a variety of data, including multimedia data such as audio and video. Accordingly, it is to be understood that embodiments are possible in which networks 125 and 145 are in fact combined into a single network, or in which video distribution network 145 is simply omitted, whereby packet switched network 125 is used to provide video signal 150 to content processing device 110.

BHR 117 is known for distributing audio, video, and data to devices within customer premises 101 such as content processing device 110. For example, in one embodiment, BHR 117 is the broadband home router or wireless broadband home router from Actiontec Electronics, Inc. of Sunnyvale, Calif.

Gateway router 120 is known for routing data packets in packet switched network 125. Gateway router 120 allows content processing device 110 to access packet switched network 125. By communicating with router 120, content processing device 110 is able to obtain a network address such as an internet protocol (IP) address, thereby enabling content processing device 110 to make requests to, and to receive data from, servers 130 and 135.

IPG server 130 provides an interactive program guide to content processing device 110 for display on video display 115. As is known, an interactive program guide allows viewers of display 115 to obtain information and to select content, generally by navigating and making selections using control device 111. IPG server 130 generally includes a processor and a memory, as well as a computer readable medium such as a disk for storing data, e.g., interactive program guide data, to be provided to content processing device 110.

Widget data server 135 is a computing device including a processor and a memory, as well as a computer readable medium for storing data. As mentioned above, widget data server 135 selectively communicates with widget data base 140 to obtain data to be displayed in widget 105 upon the request received from content processing device 110. Widget data base 140 may be included on a computer readable medium within widget data server 135, or may be a separate database.

Figure 1B:
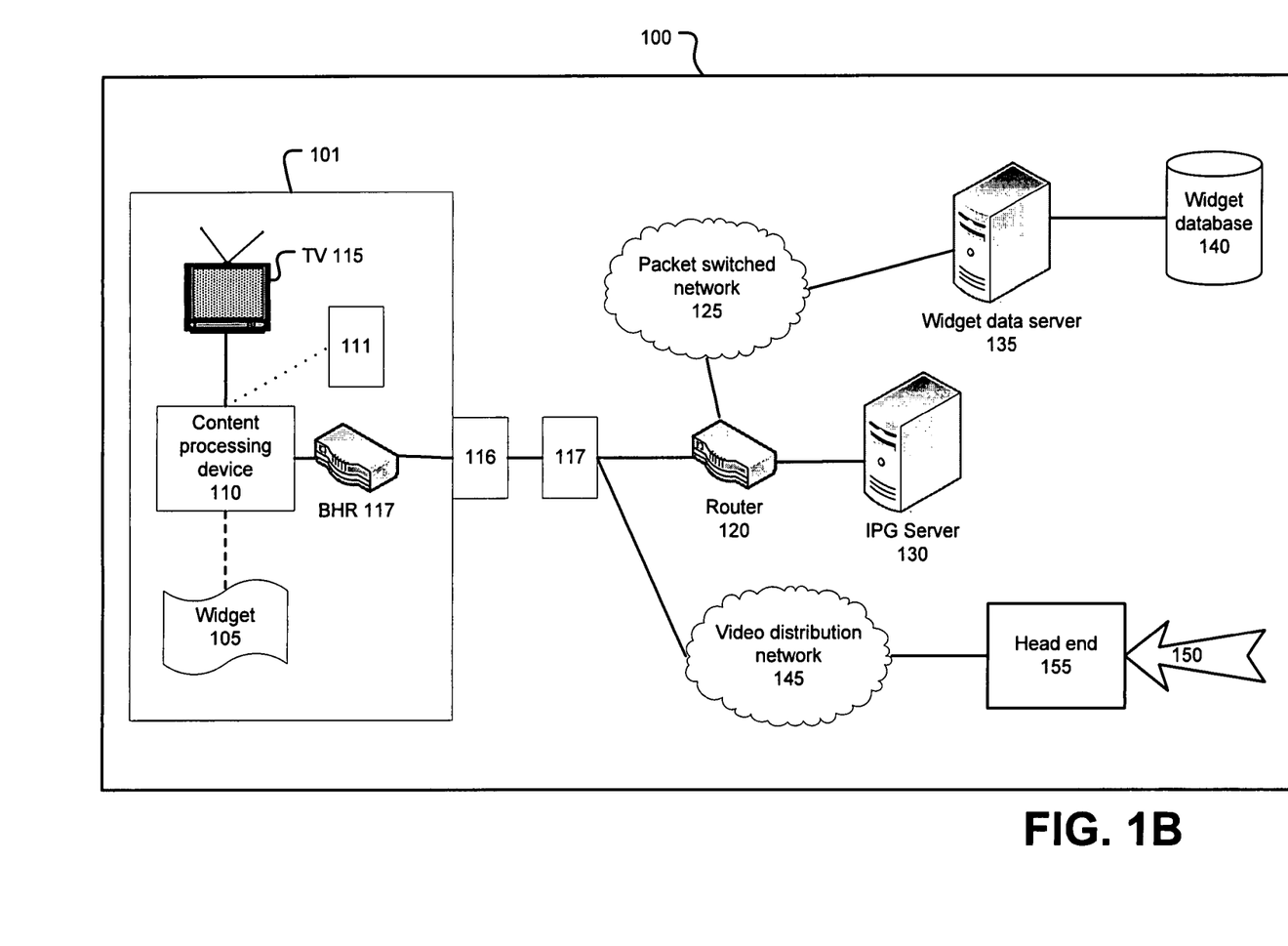
FIG. 1B illustrates another exemplary system for delivering video and for providing data.

FIG. 1B illustrates another exemplary system for delivering video signal 150 and data, including widget 105, to content processing device 110. As can be seen, FIG. 1B illustrates all of the elements illustrated in FIG. 1A, with the addition of optical line terminal (OLT) 117 and optical network terminal (ONT) 116. Accordingly, FIG. 1B illustrates an exemplary system in which fiber optic cable is used to provide both data and video signal 150 to customer premises 101, including to content processing device 110. As is known, OLT 117 may serve as a terminus for an optical network or an optical line. OLT 117 may provide data, including video signal 150, to one or more ONT's 116. ONT 116 can be situated adjacent to customer premise 101, for the purpose of providing data received over an optical line to customer premise 101, including content processing device 110. Accordingly, FIG. 1B illustrates a hybrid network system 100 in which video signal 150 transported over video distribution network 145 and data transported over packet switched network 125 are received by customer premises 101 through a fiber optic line.

Computing devices such as content processing device 110, IPG server 130, widget data server 135, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art. Content processing device 110 generally is a specialized device for receiving video signals 150 from head end 155 via network 145, and may be provided with a proprietary or specialized operating system other than those enumerated above. For example, in one embodiment, content processing device 110 is an STB provided with a real time operating system (RTOS) such as is known. However, it is to be understood that content processing device 110 may be a computing device such as one of those enumerated above, so long as the computing device is capable of receiving video signals 150 from network 145, and also is capable of storing an executing the instructions included in widget 105.

Computing devices such as content processing device 110, etc. generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
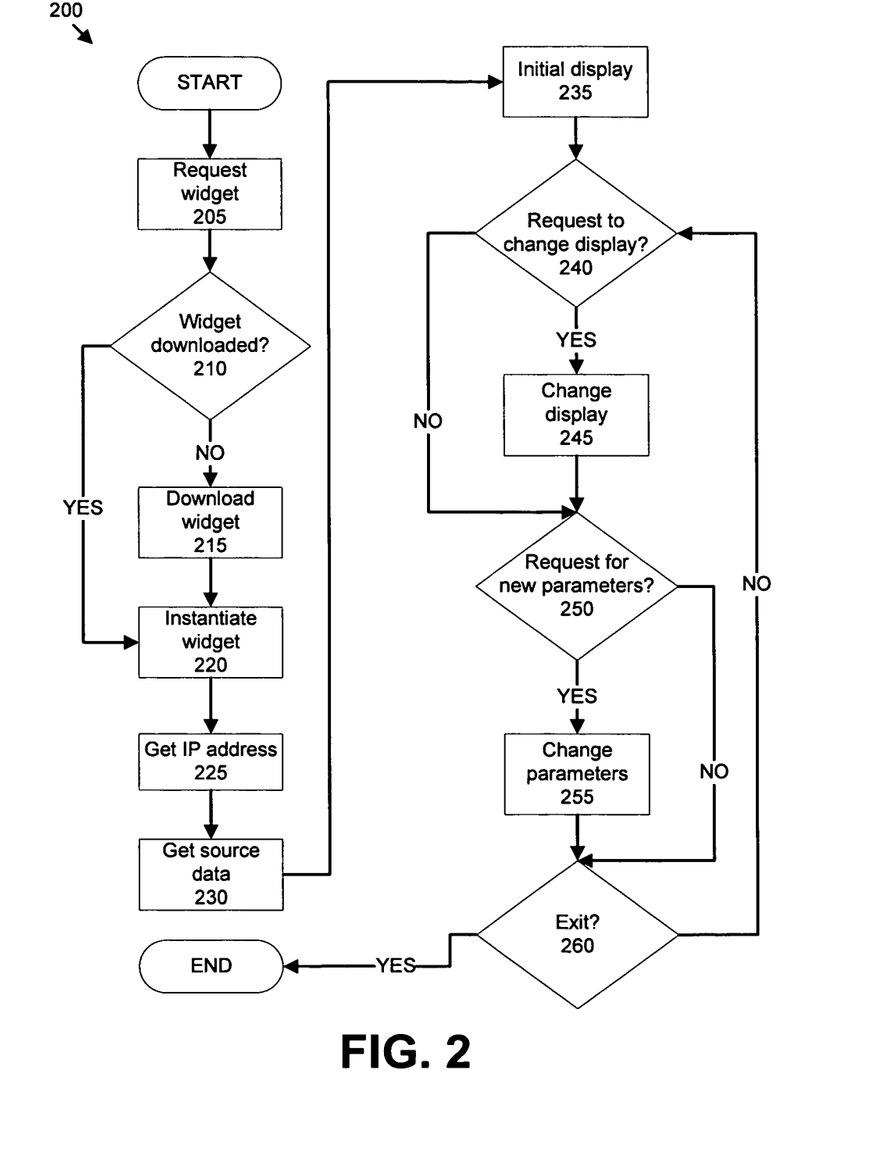
FIG. 2 illustrates an exemplary process for providing and accessing widgets in a video display.

FIG. 2 illustrates an exemplary process 200 for providing widget 105 in video display 115.

In step 205, a user selects a key or button on control device 111 to communicate to content processing device 110 a request for widget 105. Content processing device 110 may be programmed to interpret input from a particular button or key or keys on control device 111 as a request for widget 105, or widget 105 may be selected according to a menu or other option presented in an interactive program guide or other user interface displayed on video display 115.

Next, in step 210, content processing device 110 makes a determination as to whether instructions for displaying widget 105 are stored in a computer readable medium within content processing device 110. If not, process 200 precedes to step 215. However, if instructions for widget 105 are stored within content processing device 110, then step 220 is next executed.

Next, in step 215, content processing device 110 communicates with IPG server 130 through router 120 to download computer executable instructions for providing widget 105. Because memory or storage within content processing device 110 may be limited, computer executable instructions for widget 105 preferably do not consume large amounts of memory. For example, in one embodiment, computer executable instructions for widget 105, written in the JAVA™ programming language, consume roughly 150 kilobytes of memory.

Next, in step 220, widget 105 is instantiated by content processing device 110. Accordingly, instructions are executed by a processor within content processing device 110 to provide content according to widget 105 on video display 115.

Next, in step 225, content processing device 110 obtains an internet protocol (IP) address from IPG server 130. This step allows content processing device 110 to be able to request and send information for widget 105 to and from widget data server 135.

Next, in step 230, content processing device 110 obtains source data for widget 105 from widget data server 135. In general, widget data server 135 obtains the requested data for widget 105 from widget data base 140. In some embodiments, widget data base 140 is provided with data from data vendors such as Traffic.com of Wayne, Pa.; TeleAtlas (TANA) with North American Headquarters in Lebanon, N.H.; Weather.com owned by Landmark Communications, Inc., of Norfolk, Va.; Accuweather of Fort Washington, Pa.; etc. Such vendors provide, for example, real time or near real time news, weather, traffic information, sports scores, etc.

One or more of the forgoing categories of information, or other categories of information, may be requested for widget 105 by a user accessing content processing device via control device 111. Such data is generally requested according to a location associated with content processing device 110. For example, in some embodiments, a postal code such as a zip code is stored on a computer-readable medium attached to content processing device 110 when content processing device 100 is installed at customer premises 101. The postal code may then be used as a parameter of a query from content processing device 100 to widget data server 135 to obtain source data for widget 105 in step 230, whereby the data obtained is relevant to the location specified for content processing device 110. Alternatively, if widget 105 is downloaded to content processing device 110 after content processing device 110 had been installed in customer premises 101 as described with respect to step 215, then a user may be prompted to provide a location, e.g., a zip code, by providing input through control 111. Further, it should be understood that parameters other than a location could be used by content processing device 110 to request information, such as the name of a sports league, a stock symbol, etc.

Figure 3A:
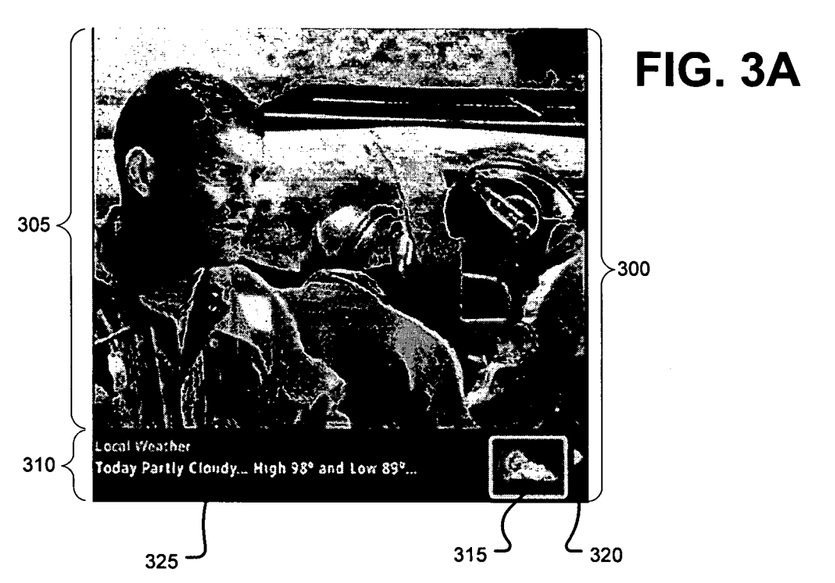
FIGS. 3A-3C illustrate exemplary interfaces and an exemplary video display including widgets.
Figure 3B:
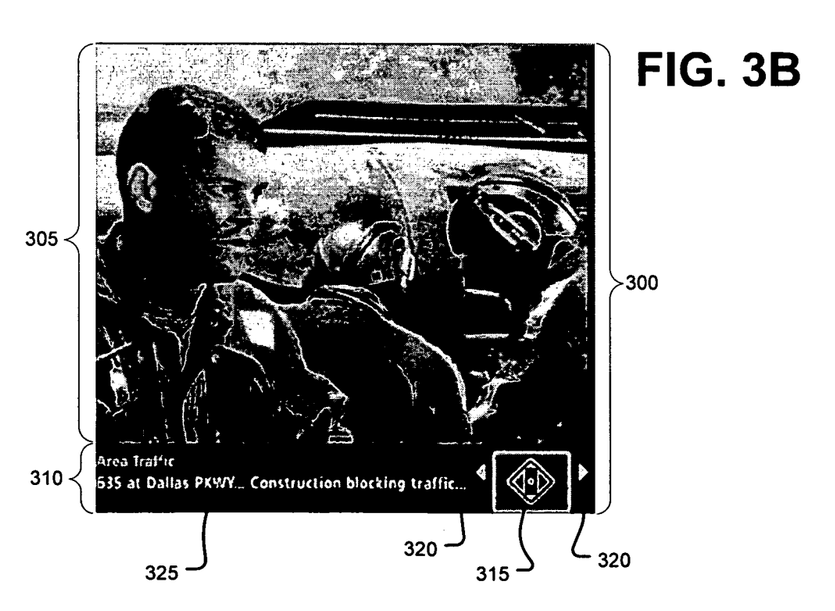
Figure 3C:
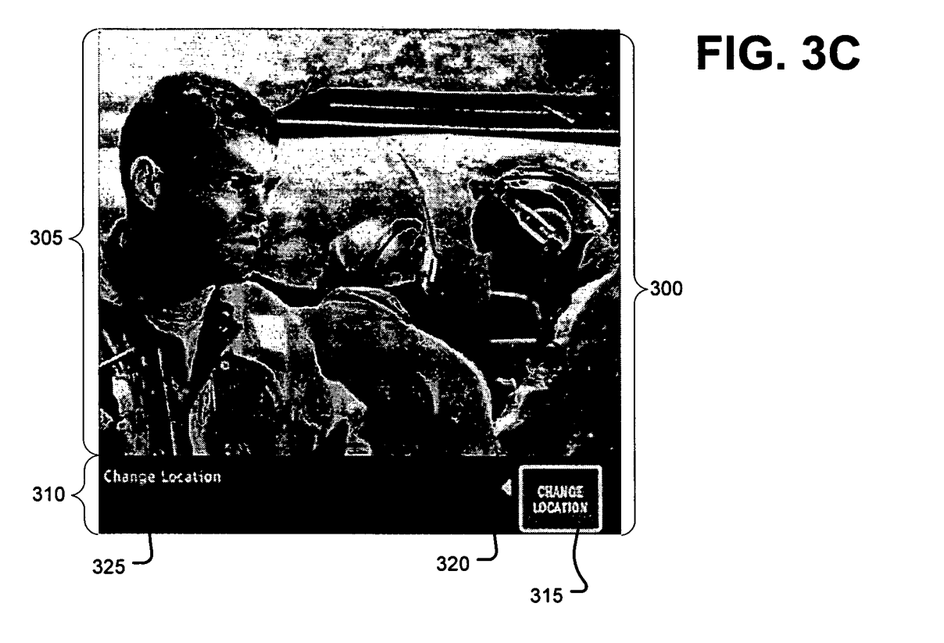

Next, in step 235, widget 105 is presented in video display 115 along with images representing video signal 105. It should be understood that widget 105 may be presented within display 115 in a variety of ways. For example, FIG. 3A illustrates an exemplary video presentation 300, such as might be seen in video display 115 after widget 105 is instantiated. Video signal 150 is displayed as a moving image 305. Widget 105 is displayed in a widget data interface 310, which includes a widget icon 315, a widget navigation arrow 320, and widget text 325. Widget icon 315 is used to provide an indication of the kind of information being displayed in widget data interface 310. Navigation arrow 320 is used to navigate to different displays of information in widget data interface 310, as is further described herein below. Widget text 325 is used to provide information to a user of video display 115.

Next, in step 240, content processing device 110, according to instructions for widget 105, determines whether a request has been received to change widget data interface 310. Such a request may be received according to input received through control device 111, e.g., by selecting navigation arrow 320 with arrow keys or other keys and pressing an "ok" button or the like. Further, widget data interface 310 could include a menu for selecting options for display within widget data interface 310. For example, widget data interface 310 could present in one portion a list of categories of information, e.g. news, sports, weather, traffic, which a user could scroll through using control device 111 to view and select from such categories.

In step 245, content processing device 110, according to instructions provided by widget 105, changes the information displayed in widget data interface 310 according to a request to change the display of such information received from a user in step 240. For example, if a user has selected navigation arrow 320, widget data interface 310 may display a new category of information according to a predetermined order for displaying categories of information in widget data interface 310. For example, widget 105 could be programmed to first display information relating to weather, then to traffic, then to news, and then to sports. Alternatively, widget 105 could be programmed to first provide information relating to traffic, and then to weather, and then to display information relating to news and sports only if users selected these categories of information from a menu. In short, different ways of allowing users to select information for display in widget data interface 310 are possible and contemplated.

In step 250, content processing device 110 determines whether a request to display in widget data interface 310 information relating to new parameters, e.g., a new location, has been received from a user of control device 111. Such request may be received by a user selecting a predetermined button or key on control device 111, or by the user selecting a "change location" icon provided in widget data interface 310, although such a change location icon is not shown as part of the illustration of widget data interface 310 herein. In one embodiment, once a user has indicated a desire to specify a new location, a user may specify such new location by entering a zip code using a numeric keypad on control device 111. A zip code as a way of specifying location for display of data by widget 105 has the advantages of being easily entered using a numeric keypad and also providing a relatively high degree of geographic specificity.

If a request for new parameters has been received in step 250, step 255 is executed next. Otherwise, step 260 is executed next.

In step 255, content processing device 110, according to instructions of widget 105, provides information related to the new parameters, e.g., new location, specified in step 250 in widget data interface 310. Generally, display of such new information requires content processing device 110 to request such new data from widget data server 135. Such request may be made in a manner similar to that discussed above concerning step 230.

In step 260, content processing device 110 determines whether a request has been received from a user of control device 111 to exit widget 105. For example, such request may be received according to a predetermined key of control device 111, or according to an "exit" icon included within widget data interface 310, as described above. If such request has been received, then process 200 ends. Otherwise, process 200 returns to step 240.

CONCLUSION

Co-pending application Ser. No. 11/600,951, filed the same day as the present application, now U.S. Pat. No. 9,106,799, issued Aug. 11, 2015, assigned to the assignee of the present application, and entitled "TRANSACTION WIDGETS" is hereby incorporated herein by reference in its entirety.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
a content processing device configured to:
store a parameter including a location of the content processing device and indicative of a preference of a user of the content processing device for content to be displayed along with an incoming video signal,
request data relating to the stored parameter,
determine whether a mechanism, for receiving and displaying the requested data, is stored within the content processing device;
download the mechanism for receiving and displaying the requested data if the mechanism is not already stored within the content processing device,
receive the requested data,
receive the incoming video signal, and
provide to a video display
(a) at least a portion of the video signal to be display a video image at a video width and,
(b) using the mechanism, a data interface at a bottom of the video display and having the entire video width of the video image, the data interface including at least a subset of the data and a navigation control with a first graphical indicator that is separated a distance from and graphically depicts a first type of information provided by the subset of the data and that changes to a second graphical indicator that is separated the distance from and graphically depicts a second type of information provided by the subset of the data,
wherein the first and second graphical indicators include respective first and second icons associated with the subset of data and that are scrollable through at least two of news, sports, weather, and traffic information while the subset of data changes according to the respective first and second icons.

2. The system of claim 1, further comprising a fiber optic cable that is used to transmit the data and the video signal to the content processing device.

3. The system of claim 1, wherein the content processing device is a set top box.

4. The system of claim 1, wherein the content processing device stores the location on a computer-readable medium, the location being the specified parameter that is selectively used to request the data.

5. The system of claim 1, further comprising:
a data server that provides the data; and
a video head end that provides the video signal.

6. The system of claim 5, wherein the data server provides the data through a packet switched network and the video head end provides the video signal through a video distribution network that includes coaxial cables.

7. The system of claim 5, wherein the data server provides the requested data to the content processing device according to an internet protocol (IP) address.

8. The system of claim 1, the content processing device further configured to receive an input of a new parameter, to request data related to the new parameter, and to display the data related to the new parameter in place of the data.

9. A method, comprising:
storing a parameter including a location of a content processing device and indicative of a preference of a user of a content processing device for content to be displayed along with an incoming video signal;
determining whether a mechanism, for receiving and displaying the requested data, is stored;
downloading the mechanism for receiving and displaying the requested data if the mechanism is not already stored within the content processing device;
receiving both the requested data and an incoming video signal in a content processing device;
providing the incoming video signal to a video display, whereby the video display displays a video image at a video width; and
using the mechanism to provide a data signal including the data from the content processing device in the video display, whereby the video display displays a data interface at a bottom of the video display and having the entire video width of the video image, the data interface including at least a subset of the data and a navigation control with a first graphical indicator that is separated a distance from and graphically depicts a first type of information provided by the subset of the data and that changes to a second graphical indicator that is separated the distance from and graphically depicts a second type of information provided by the subset of the data,
wherein the first and second graphical indicators include respective first and second icons associated with the subset of data and that are scrollable through at least two of news, sports, weather, and traffic information while the subset of data changes according to the respective first and second icons.

10. The method of claim 9, wherein a fiber optic cable is used to transmit the data and the video signal to the content processing device.

11. The method of claim 9, further comprising storing a parameter on a computer-readable medium, the parameter being selectively used to request the data.

12. The method of claim 11, wherein the location of the content processing device is stored according to user input.

13. The method of claim 12, wherein the user input includes selection of at least one of a predetermined button and a change location icon and wherein the user input provides the location to replace a previously stored location.

14. The method of claim 9, wherein a data server provides the data and a video head end provides the video signal.

15. The method of claim 14, wherein the data server provides the data through a packet switched network and the video head end provides the video signal through a video distribution network that includes coaxial cables.

16. The method of claim 9, further comprising obtaining an internet protocol (IP) address with which to request the data.

17. The method of claim 9, tangibly embodied on a non-transitory computer-readable storage medium as computer-executable instructions.

18. The method of claim 9, further comprising:
receiving an input indicative of a request to change the data signal in the content processing device;
requesting a new data signal from a remote data server; and
including the new data signal in the data interface.

19. A system, comprising:
a packet switched network;
a video distribution network that includes coaxial cable; fiber optic cable;
a gateway router that connects the packet switched network and connects the video distribution network to the fiber optic cable;
a video head end that selectively provides a video signal via the video distribution network;
a data server that selectively provides data through the packet switched network;
a broadband home router that selectively receives the data and the video signal via the fiber optic cable;
a content processing device that is connected to the broadband home router and that is configured to receive both the data and the video signals, wherein the content processing device is configured to store a parameter including a location of the content processing device and indicative of a preference of a user of the content processing device, the location being stored on a computer-readable medium, the location being selectively used to request the data, the content processing device being further configured to determine whether a mechanism, for receiving and displaying the requested data, is stored within the content processing device and to download the mechanism for receiving and displaying the requested data if the mechanism is not already stored within the content processing device;
a control device in selective communication with the content processing device, whereby the user may request data and video content;
a video display that receives the incoming video signal from the content processing device, whereby the video display displays a video image at a video width, and wherein the video display further selectively receives a data signal including the data from the content processing device, whereby the video display displays a data interface at a bottom of the video display and having the entire video width of the video image, the data interface including at least a subset of the data and a navigation control with a first graphical indicator that is separated a distance from and graphically depicts a first type of information provided by the subset of the data and that changes to a second graphical indicator that is separated the distance from and graphically depicts a second type of information provided by the subset of the data,
wherein the first and second graphical indicators include respective first and second icons associated with the subset of data and that are scrollable through at least two of news, sports, weather, and traffic information while the subset of data changes according to the respective first and second icons.

* * * * *